United States Patent [19]

Ohashi

[11] Patent Number: 5,848,364

[45] Date of Patent: Dec. 8, 1998

[54] METHOD AND APPARATUS FOR VEHICLE NAVIGATION AND GUIDANCE THROUGH A TRAFFIC CIRCLE

[75] Inventor: Mikio Ohashi, Takanezawa-Machi, Japan

[73] Assignee: Honda Giken Kogyo Kabushiki Kaisha, Tokyo, Japan

[21] Appl. No.: 644,480

[22] Filed: May 10, 1996

[51] Int. Cl.[6] .................................................. G06F 165/00
[52] U.S. Cl. .................................. 701/26; 701/25; 701/23; 340/995
[58] Field of Search .................................. 340/988, 995; 701/23, 25, 26

[56] References Cited

U.S. PATENT DOCUMENTS

| 4,796,191 | 1/1989 | Honey et al. ............................ 364/430 |
| 4,914,605 | 4/1990 | Loughmiller, Jr. et al. ............. 364/518 |
| 5,072,395 | 12/1991 | Bliss et al. ............................. 364/443 |
| 5,107,433 | 4/1992 | Helldörfer et al. ..................... 364/444 |
| 5,177,685 | 1/1993 | Davis et al. ............................ 364/443 |
| 5,243,528 | 9/1993 | Lefebvre ............................... 364/449.4 |
| 5,311,195 | 5/1994 | Mathis et al. .......................... 342/357 |
| 5,337,244 | 8/1994 | Nobe et al. ............................. 364/449 |
| 5,508,930 | 4/1996 | Smith, Jr. ............................. 364/444.1 |
| 5,508,931 | 4/1996 | Snider .................................. 364/449.1 |
| 5,515,283 | 5/1996 | Desai et al. ............................ 364/443 |
| 5,550,538 | 8/1996 | Fujii et al. ............................. 340/995 |
| 5,559,511 | 9/1996 | Ito et al. ............................... 340/995 |
| 5,659,476 | 8/1997 | LeFebvre et al. ..................... 364/444.1 |

Primary Examiner—Vincent N. Trans
Attorney, Agent, or Firm—Lyon & Lyon LLP

[57] ABSTRACT

A vehicle navigation system and guidance method for effectively guiding a driver through a traffic circle; the driver is given instructions to exit at the given turnoff, but if the driver misses the proper turnoff, the system does not indicate the situation as "off-route" but continues to direct the driver around the circle and then again provide the exit instruction as the proper turnoff is again approached.

10 Claims, 3 Drawing Sheets

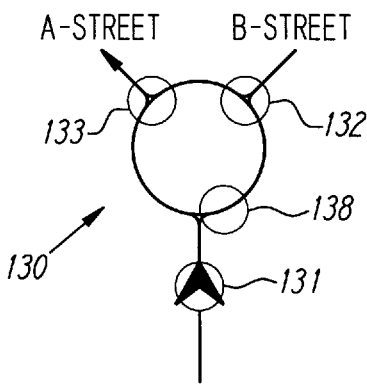
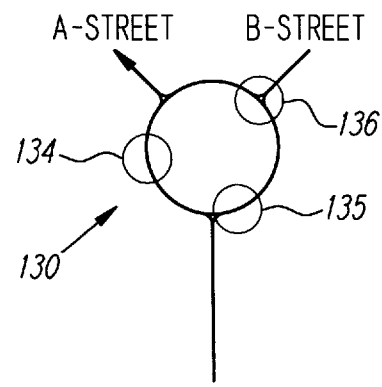
FIG. 4  FIG. 5
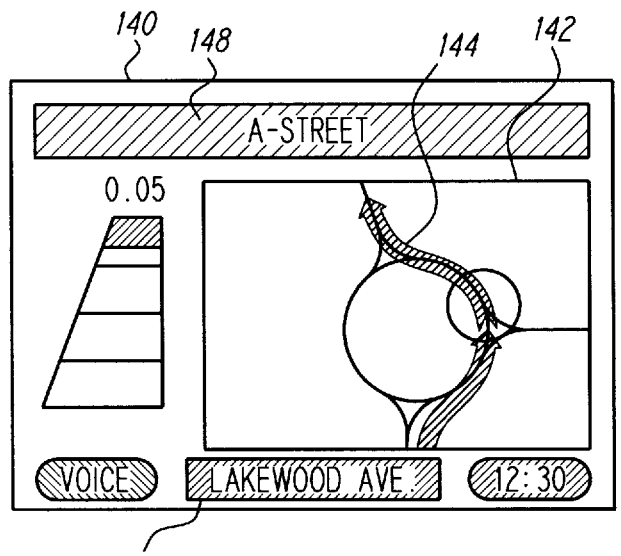
FIG. 6
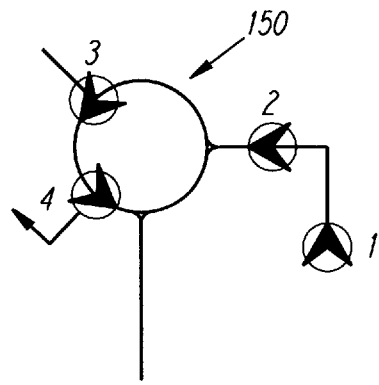
FIG. 7

METHOD AND APPARATUS FOR VEHICLE NAVIGATION AND GUIDANCE THROUGH A TRAFFIC CIRCLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The field of the present invention relates to navigation systems for vehicles and more particularly to a method and apparatus which controls route calculation and driver guidance through a traffic circle.

A traffic circle constitutes a difficult obstacle for vehicle navigation systems to route and guide the driver through. A traffic circle typically has two or more exits which are frequently closely spaced providing limited time for the driver to react to turn instructions. If the driver misses the intended turnoff, the typical system detects the condition and proceeds to an "off-route" routine, calculating an alternate route. The present inventor has determined that systems and drivers can become confused when the correct exit from a traffic circle is not taken and a better guidance system can be devised.

SUMMARY OF THE INVENTION

The present invention relates to a vehicle navigation system and guidance method for effectively guiding the driver through a traffic circle. Upon entering the traffic circle, the driver is instructed to exit the traffic circle, as the proper exit street from the circle is approached, preferably providing an audible "Exit right" command. If the driver misses the proper turnoff, the system does not indicate the situation as "off-route" but continues to direct the driver around the circle and then again provide the turn instruction as the appropriate turnoff is again approached.

BRIEF DESCRIPTION OF THE DRAWINGS

FIG. 4 is a diagrammatic map segment of a traffic circle showing location of vehicle positions where guidance instructions are given;

FIG. 5 is a diagrammatic map segment of the traffic circle of FIG. 4 with vehicle locations for further instructions;

FIG. 6 shows a display screen image of the traffic circle guidance screen;

FIG. 7 is a diagrammatic map segment of a traffic circle showing location of vehicle positions where guidance instructions for multiple maneuvers are given.

DETAILED DESCRIPTION OF THE PREFERRED EMBODIMENTS

The preferred embodiments of the present invention will now be described with reference to the drawings. To facilitate description, any identifying numeral representing an element in one figure will represent the same element in any other figure.

Figure 1:
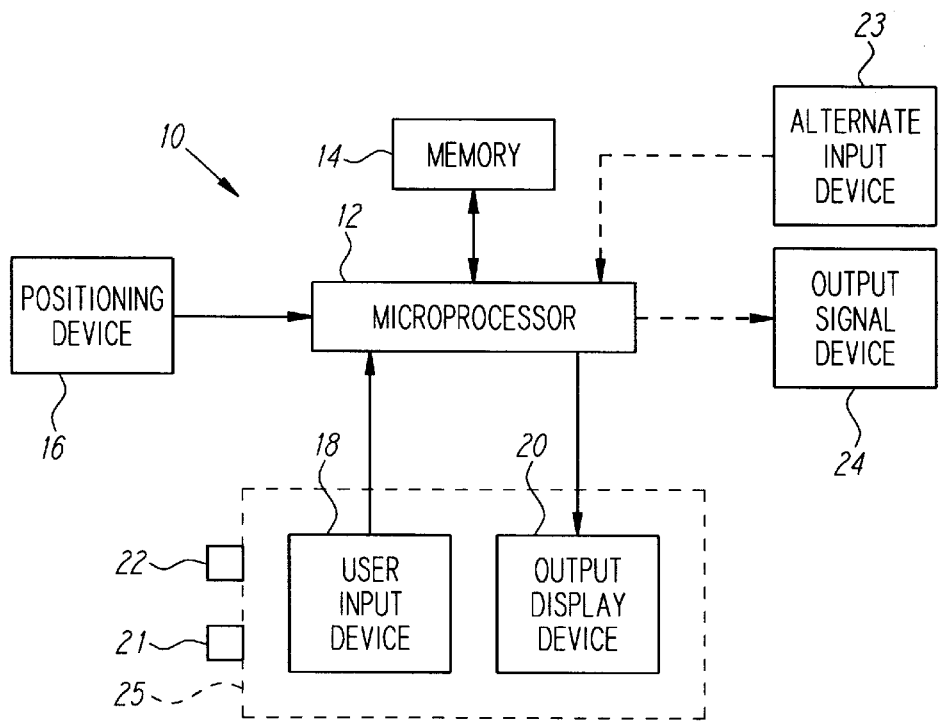
FIG. 1 is schematic of a navigation system such as may be implemented by the present invention.

FIG. 1 illustrates the elements of a navigation system 10 which may be implemented with the input system according to the present invention. The heart of the navigation system 10 is the microprocessor or computer 12 which receives data from the positioning location device 16 and data from its memory 14 to ascertain the current location of the vehicle whether it is moving or stationary. The positioning device preferably may comprise input from any suitable source, such as a global positioning satellite system (GPS), travel path reckoning system or some other positioning determination system as known in the art. The memory 14 provides data of map information comprising a database of map locations, streets, places, traffic pattern, control data and other suitable information. The microprocessor 12 may output display information to the display device 20, preferably comprising a liquid crystal display screen on which the system may display various information to the user including area maps, travel route, destination, route instructions, or other information.

The destination is input by a user input device 18 which provides the necessary input from the user of the desired destination. The input device may be a keyboard, a touch screen, one or more switches, pointing or control device such as a joystick or mouse, or combinations thereof. In its preferred form, the output display device 20 and the user input device 18 are combined in a touch activated display screen 25 as part of a control panel including switches 21, 22 located on the dashboard of the vehicle. The system 10 may include an alternate or supplemental input device 23, comprising, for example, a voice activation system, as is known in the art, for inputting commands into the system. The system 10 also preferably includes an output signal device 24, which may provide, for example, an audio output of route instructions. By providing audible instructions, the user can concentrate entirely on the road and receive complete route instructions without having to view the display device 20.

Figure 2:
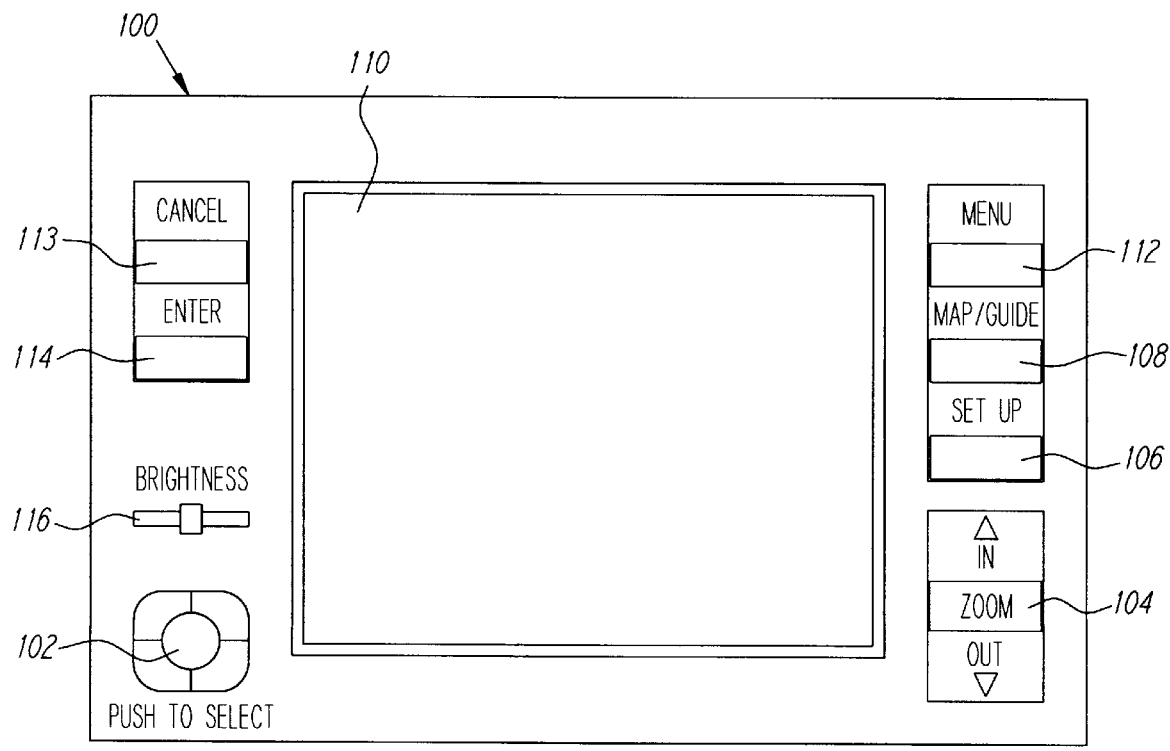
FIG. 2 is a front plan view of a display panel for a navigation system according to the present invention.

FIG. 2 illustrates a preferred control panel 100 comprised of a touch display screen 110 and a plurality of switches which accommodates both visual display and user input for the system. The navigation system starts booting up as soon as the vehicle engine is turned on. Upon bootup, the display screen 110 is activated; if the user does not commence an operation within 30 seconds, the screen 110 switches to an off or sleep mode which may be activated by the user touching the screen 110, the joystick 102 or any of the switches 104–116. The joystick 102, the zoom switch 104, the cancel switch 113 and the enter switch 114 assist in inputting information and controlling various aspects for the navigation system.

The set up switch 106, the map/guide switch 108, and the menu switch 112 each initiate specific display screens. For permitting input by the system. A preferred input system is described in detail in co-pending U.S. application Ser. No. 08/644,852 filed May 10, 1996 under attorney docket no. 215/287 entitled METHOD AND APPARATUS FOR DESTINATION INPUT IN A VEHICLE NAVIGATION SYSTEM herein incorporated by reference. In the preferred embodiment, once the user has inputted the desired destination, the user is enabled to select a desired protocol for calculating the travel route and the navigation system calculates and displays a trip route.

Figure 3:
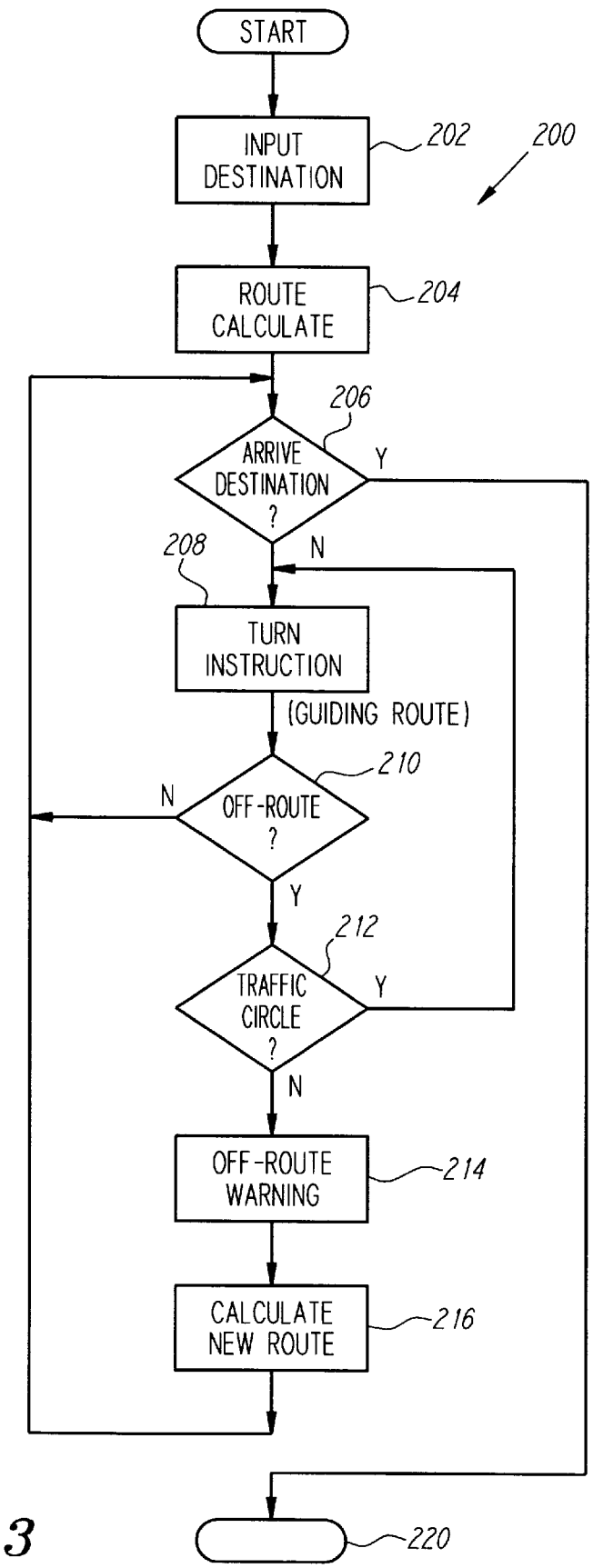
FIG. 3 is a flow chart of traffic circle guidance scheme for the system according to the present invention.

FIG. 3 is a flow chart detailing guidance protocol 200 for a system encountering a traffic circle. The user enters the destination in the normal manner (step 202) and the system calculates the route (step 204). Providing the appropriate instructions, the system guides the user to the destination. If the vehicle has reached the destination, as determined in step 206, the system indicates the destination has been reached. If the destination has not been reached, the system will continue to provide turn instructions (step 208) to guide the user along the calculated route. At appropriate intervals, the system checks whether the vehicle has gone "off-route" (step 210) and if the vehicle has remained on route, returns to destination check step 206 and further turn instructions 208.

If it is determined in step 210 that the vehicle is off-route, the system first checks (step 212) whether the vehicle is in a traffic circle. If the vehicle is not in a traffic circle, an off-route warning (step 214) is provided and the system calculates a new route (step 216) to the destination and returns to destination check step 206 and turn instruction step 208.

If it is determined in step 212 that the vehicle is in a traffic circle, the system returns to step 208 for further turn instructions and does not proceed to the off-route routine for recalculating route.

FIGS. 4–6 illustrate operation of the traffic circle protocol. As the vehicle approaches the traffic circle, the screen 140 shown in FIG. 6 is displayed illustrating a map portion 142 of the traffic circle. The travel route is superimposed on the map portion 142 by a thick lined arrow 144 to the exit street (A-Street). The name of the current street location (Lakewood Ave.) is displayed in lower field 146 and the name of the turn-off street (A-Street) is displayed in the upper field 148.

Referring to FIG. 4, as the vehicle approaches the traffic circle 130 in addition to the map guide provided in screen 140, the system also provides an audible voice command at point 131 "Enter traffic circle and take 2nd exit". The driver proceeds around the circle and right after the first street (B-Street) is passed at point 132, the voice command "Exit right" is given. If the driver exits the circle onto A-Street as instructed, the system proceeds on route.

If the driver misses A-Street and stays on the circle (see FIG. 5) the system does not indicate the situation as off-route but continues to display the route around the circle with the guide arrow 144. When the driver has again passed the last diverging exit at point 136, the audible command "Exit right" will again be given to instruct the driver to exit at the next turnoff onto A-Street. Alternately, additional preparatory commands may be given at point 134 "Take 3rd right" or at point 138 "Take 2nd right" to provide further guidance.

If the route was to take the vehicle to exit at B-Street, the audible command at point 131 would be "Enter traffic circle then take first exit" and at point 138 "Exit right". The multiple commands are given to provide the driver with adequate time to react to the commands, particularly where the distance is short between consecutive streets or maneuvers.

FIG. 7 is a schematic map portion illustrating locations for where commands are given for multiple maneuvers through a traffic circle 150. At position 1, since the distance between the turn and the traffic circle is so short, the preparatory command "Left turn then enter traffic circle ahead" is given to provide adequate notice of the upcoming traffic circle 150. After the turn is taken at point 2 the command "Enter traffic circle then take 2nd exit" is given. After the first exit is passed at point 3 the command "Exit right" is made. Upon exiting the circle at point 4, the command "Right turn" is given to make the final turn of the maneuver. If the driver misses the exit at point 4, the system proceeds as in the previous example to allow the driver to continue about the circle and again provides the command "Exit right" at point 3.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. In a navigation system for a vehicle, a method of guiding a vehicle along a calculated route through a traffic circle comprising the steps of:

determining an appropriate turnoff from the traffic circle along the calculated route;

signaling entry of the vehicle into the traffic circle;

at an appropriate point, notifying user to exit the circle at the appropriate turnoff;

determining that the vehicle has missed the appropriate turnoff;

before proceeding to an off-route routine, determining that the vehicle is still in the circle and instructing the user to proceed around the circle; and at an appropriate point, again notifying user to exit the circle at the appropriate turnoff.

2. A method according to claim 1 further comprising proceeding to an off-route routine and calculating a new route only after the vehicle has exited the traffic circle at other than the appropriate turnoff.

3. A method according to claim 1 further comprising proceeding to an off-route routine for recalculating the preferred route only if it is first determined that the vehicle is not still in the traffic circle.

4. In a navigation system for a vehicle, a method of guiding a vehicle along a calculated route through a traffic circle comprising the steps of:

calculating a route to a desired destination;

determining that the route calculated includes passage through a traffic circle;

determining an appropriate turnoff from the traffic circle along the calculated route;

determining that the vehicle has entered the traffic circle;

at an appropriate point, notifying user to exit the circle at the appropriate turnoff;

determining that the vehicle has missed the appropriate turnoff;

determining that the vehicle is still in the circle and instructing the user to proceed around the circle; and at an appropriate point, again notifying user to exit the circle at the appropriate turnoff.

5. In a navigation system for a vehicle, a method of guiding a vehicle along a calculated route, comprising the steps of:

calculating a preferred route to a desired destination;

guiding the vehicle along the preferred route;

determining that the vehicle has deviated from the preferred route along a traffic circle;

after it has been determined that the vehicle has deviated from the preferred route, determining that the vehicle is in the traffic circle, instructing the user to proceed around the traffic circle, and at an appropriate point notifying user to exit the circle at an appropriate turnoff.

6. A method according to claim 5 further comprising only after it is first determined that the vehicle is not in a traffic circle, proceeding to an off-route routine for recalculating the preferred route.

7. A method according to claim 5 further comprising prior to entry into a traffic circle, notifying the user that a traffic circle is approaching and instructing the user to enter the traffic circle.

8. A method according to claim 5 further comprising prior to entry into a traffic circle, instructing the user as to which turnoff in the traffic circle is to be taken.

9. A navigation system for a vehicle, comprising:

a positioning device for determining actual position of the vehicle;

input device for permitting a user to input a desired destination;

means for calculating a preferred route to a desired destination;

means for guiding the user along the preferred route;

means for guiding the user through a traffic circle, including means for selecting an appropriate turnoff from the traffic circle, means for determining that the vehicle has missed the appropriate turnoff, means for determining that the vehicle is still in a traffic circle, means for instructing the user to proceed around the circle, and means for notifying user to exit the circle at the appropriate turnoff.

10. A navigation system according to claim 9 wherein the positioning device comprises a global positioning satellite system.

* * * * *